United States Patent [19]

Koch

[11] Patent Number: 4,733,178

[45] Date of Patent: Mar. 22, 1988

[54] MAGNETIC THICKNESS GAUGE WITH THIRD SUPPORT

[75] Inventor: Frank Koch, Ogdensburg, N.Y.

[73] Assignee: Linda Koch, Ottawa, Canada

[21] Appl. No.: 782,728

[22] Filed: Oct. 1, 1985

Related U.S. Application Data

[62] Division of Ser. No. 341,337, Jan. 21, 1982.

[51] Int. Cl.[4] .............................................. G01B 7/10
[52] U.S. Cl. ................................................. 324/230
[58] Field of Search ................................ 324/229–231

[56] References Cited

U.S. PATENT DOCUMENTS

| | | |
|---|---|---|
| 3,521,160 | 7/1970 | Nix et al. ............................. 324/230 |
| 4,125,807 | 11/1978 | Steingroever ....................... 324/230 |
| 4,152,646 | 5/1979 | Steingroever et al. ............. 324/230 |
| 4,164,707 | 8/1979 | Nix ...................................... 324/230 |
| 4,403,188 | 9/1983 | Nix ...................................... 324/230 |

FOREIGN PATENT DOCUMENTS

| | | |
|---|---|---|
| 542968 | 2/1942 | United Kingdom . |
| 575150 | 2/1946 | United Kingdom ................ 324/230 |
| 1136915 | 12/1968 | United Kingdom ................ 324/230 |
| 2073425 | 10/1981 | United Kingdom ................ 324/230 |

OTHER PUBLICATIONS

Nix et al, "Mikrotest®", pp. 1–6, sales brochure of magnetic thickness gauge.

Primary Examiner—Reinhard J. Eisenzopf
Assistant Examiner—Warren S. Edmonds
Attorney, Agent, or Firm—Burns, Doane, Swecker & Mathis

[57] ABSTRACT

A magnetic thickness gauge is disclosed wherein a balance arm is pivotally mounted in a housing with a spring providing a bias force to counteract a magnetic attraction of the balance arm toward a base of a coating to be measured. The balance arm is provided with a probe assembly including a magnet selectively positionable with respect to a spherical contact member of either a particular alloy of aluminum, iron and silicon or of tungsten carbide. The housing is preferably provided with supports at either end of the gauge. A balance arm is moved by way of a protrusion provided between the probe assembly and an adjustment knob for the spring with a scale and pointer indicating the thickness of the coating to be measured.

9 Claims, 10 Drawing Figures

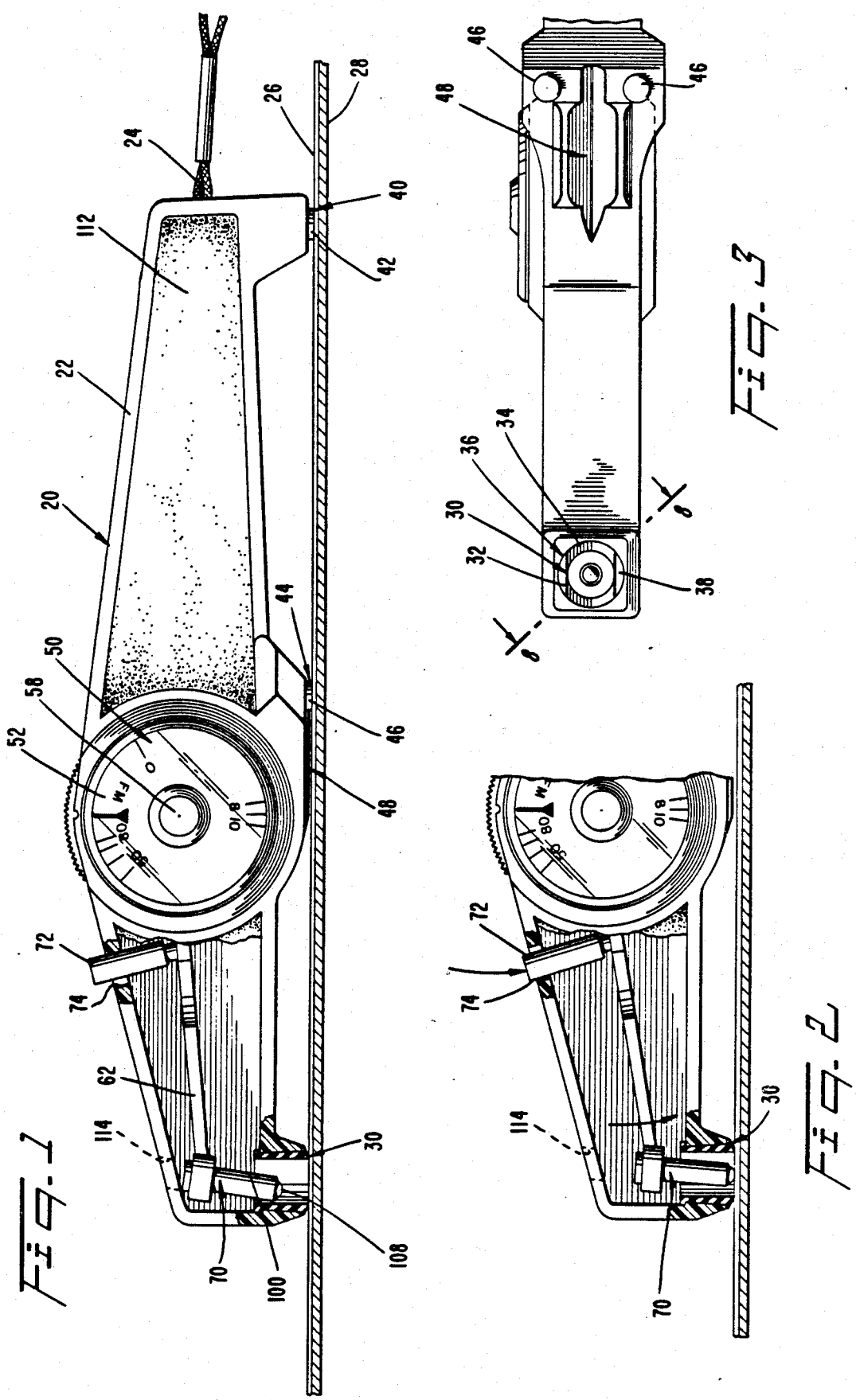

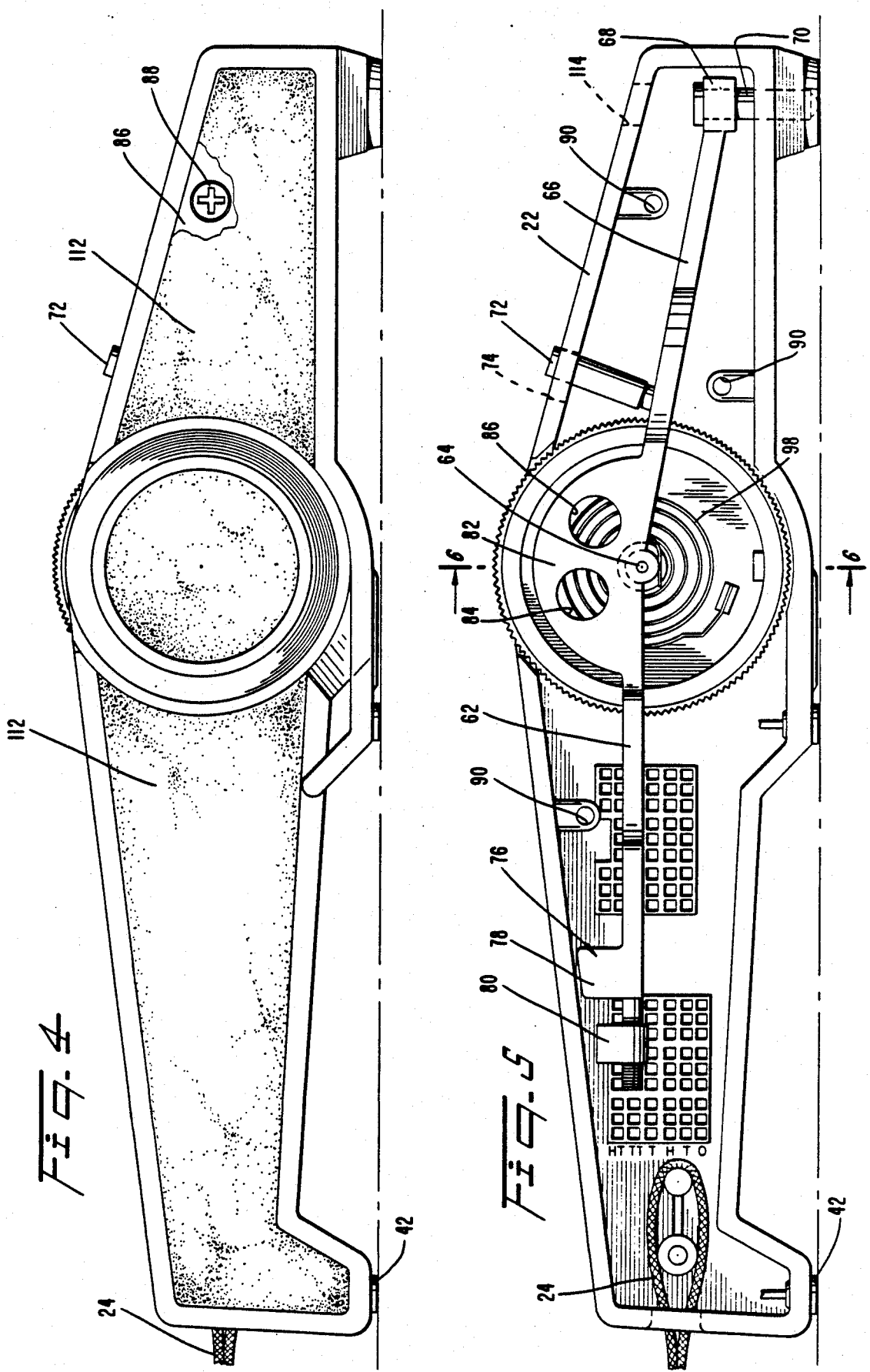

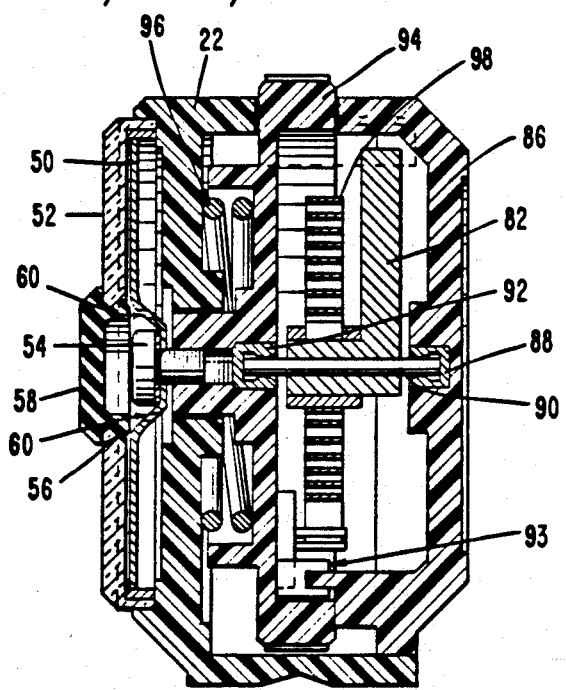
Fig. 6
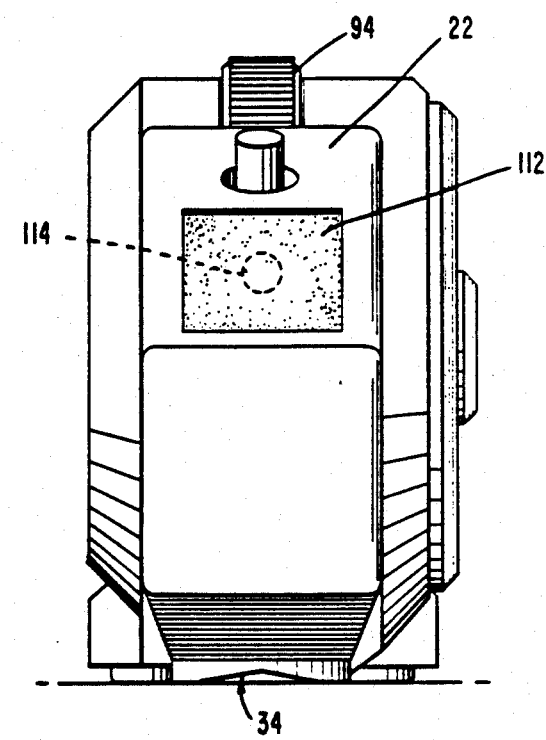
Fig. 7
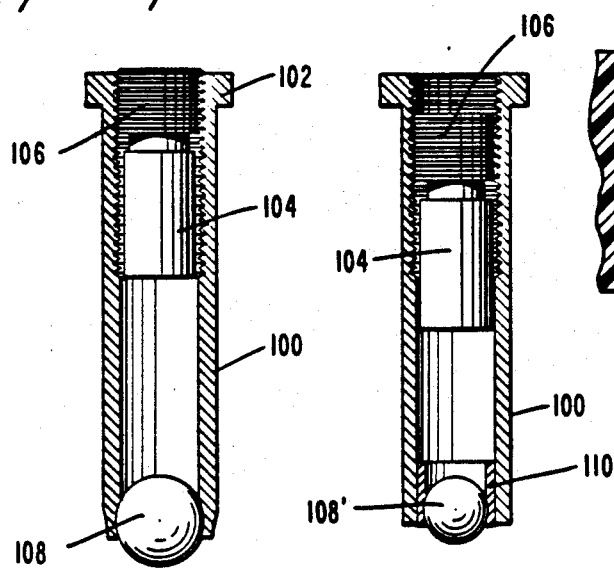
Fig. 9
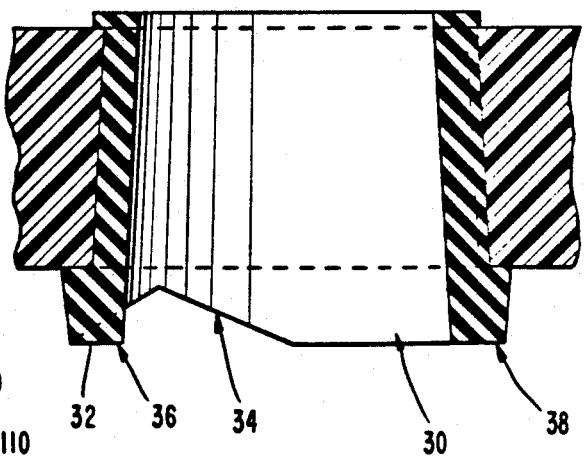
Fig. 8
Fig. 10

MAGNETIC THICKNESS GAUGE WITH THIRD SUPPORT

This application is a division, of application Ser. No. 341,337, filed Jan. 21, 1982.

BACKGROUND OF THE PRESENT INVENTION

The present invention relates generally to gauges for measuring the thickness of coatings and more specifically relates to gauges for magnetically measuring the thickness of a nonmagnetic coating on a magnetizable material.

Various magnetic coating thickness gauges are known in the art wherein a probe surface is magnetically maintained in contact with a coating to be measured. Generally, a spring biases the probe surface away from the coating to be measured with the force applied by the spring then gradually increased by an operator until the probe surface separates from the coating to be measured. At that instant, a pointer on a scale indicates the thickness of the coating. The scale is typically rotated to tension the spring and thereby gradually increase the spring force applied to the probe surface.

In some magnetic coating thickness gauges, a magnet is provided at one end of a balance arm with the magnet placed in direct contact with the coating to be measured. In other gauges, an intermediary material is provided between the magnet and the coating to be measured.

In the known magnetic coating thickness gauges having a balance arm, however, the magnet or the intermediary material which contacts the coating to be measured is of a relatively soft material with the result that the magnet or intermediary material frequently wears away during a relatively short period of time. Since the erosion of the magnet or the intermediary material affects the magnetic attraction between the contact surface and the material bearing the coating to be measured, the accuracy of the magnetic coating thickness gauge is seriously affected.

For example, in the measurement of chrome plating of ferrous materials, conventional magnetic coating thickness gauges oftentimes become useless or in need of calibration in a period of use as short as one day. Accordingly, the need exists for a magnetic coating thickness gauge having a coating surface of a durable material sufficient to permit prolonged use on a variety of hard coatings.

Magnetic coating thickness gauges are known which have a probe contact surface of a wear resistant material. In U.S. Pat. No. 3,999,120, of Streng, for example, a spherical sector is attached to the front faces of a soft-iron magnetic yoke, and forms the probe tip for the gauge. The spherical sector is a ground half ball-bearing which is electrically welded to a flat plate at the end of a threaded shaft. The spherical sector is provided with a titanium carbide layer by gaseous diffusion to provide a wear resistant surface. A similar arrangement is shown in U.S. Pat. No. 4,041,378 of Ott.

To provide a wear resistant surface in the manner shown by the Streng patent, however, is particularly expensive and difficult to accomplish. Accordingly, the need exists for a relatively low cost magnetic thickness gauge having a wear resistant probe tip.

In a conventional magnetic coating thickness gauge, the gauge is calibrated during assembly through the use of an electromagnetic coil which externally applies a magnetic field to the magnetic material in the probe assembly to provide the magnetic material with a desired degree of magnetization. Such a calibration procedure is particularly troublesome to accomplish and the recalibration procedure is even more troublesome to perform should the gauge require recalibration at some future time. In order to recalibrate such a magnetic probe assembly, at least a partial disassembly of the magnetic coating thickness gauge is typically required.

Since the range over which the magnetization of the magnetizable material in the probe assembly can be varied is typically rather small, the conventional magnetic coating thickness gauge requires a particularly close correlation between the biasing force provided by the spring and the magnetic attractive force provided by the probe assembly. In this way, a relatively high level of precision is necessary for the spring assembly which biases the probe assembly away from the coating to be measured with the result that either relatively expensive springs are required or that the rejection rate for springs of lesser expense is typically high.

Therefore, the need exists for a magnetic coating thickness gauge having a calibration arrangement wherein the range of attractive force provided by the magnetizable probe assembly is relatively great and easily varied so as to accommodate a correspondingly large range of biasing force provided by the spring assembly.

In a commercially available magnetic coating thickness gauge of Electro-Physik (such as is shown in U.S. Pat. Nos. 4,160,208, 3,761,804, 3,699,487 and 3,521,160 which are hereby incorporated by reference) a handle is provided rearwardly of an indicator scale with the handle normally grasped by the operator during use. Typically, the thumb of the operator is used to rotate an adjustment wheel which varies the biasing force provided by the spring. The thickness gauge is supported both adjacent a probe assembly and immediately beneath the indicator scale (at about a mid-section of the gauge) with the result that the operator typically grips the gauge behind the indicator scale. The downward force applied by the operator rearwardly of the indicator scale tends to pivot the gauge about the support provided beneath the indicator. If the gauge is pivoted, the probe will no longer contact the coating to be measured resulting in a false reading for the gauge. Accordingly, the use of two hands to operate the conventional gauge is frequently necessary with the operation of the conventional gauge oftentimes awkward to perform.

Incorrect operation of the conventional thickness gauge also typically results from an inadvertent placement of the user's hand over a protrusion of the balance arm (which is provided to enable the user to initially position the probe assembly in contact with the coating to be measured). If the user's hand obstructs the free movement of the protrusion (and in turn the balance arm), the probe assembly cannot freely lift away from the coating to be measured (when the spring force equals the magnetic attractive force) with the result that an inaccurate reading is obtained.

Accordingly, the need exists for a magnetic coating thickness gauge having a housing and balance arm assembly which facilitates the correct operation of the thickness gauge and which facilitates operation of the gauge with only one hand.

SUMMARY OF THE PRESENT INVENTION

In the present invention, there is provided a magnetic coating thickness gauge for magnetically measuring the thickness of a coating with the gauge including a housing having a balance arm mounted in the housing about a pivot. The balance arm is provided with a probe assembly and is arranged to be selectively urged into contact with the coating to be measured with a resilient member or spring providing a force which urges the balance arm away from the coating to be measured. The probe assembly magnetically attracts the balance arm toward the base of the coating to be measured. The force provided by the resilient member may be selectively varied by the operator with an indicator and appropriate scale provided for indicating the thickness of the coating to be measured. Finally, the probe assembly includes a contact member with a magnet and an arrangement for selectively spacing the magnet away from the contact member.

In the preferred embodiment of the present invention, the magnet is spaced away from the contact member by a set-screw which is threadably received within a casing provided at one end of the balance arm. Preferably, the set-screw is comprised of a material such as steel or a steel alloy which is magnetically attracted to the magnet with the magnet being magnetically attached to one end of the set-screw. Still further, the casing is preferably of a substantially non-magnetic material such as brass with the contact member being spherical and of either tungsten carbide or a particular, wear-resistant alloy of aluminum, iron and silicon.

The threaded set-screw facilitates an initial calibration of the magnetic thickness gauge by permitting a selective movement of the magnet toward or away from the contact member. In this way, the magnetic attractive force can be readily correlated to the biasing force provided by the spring. Should recalibration become necessary, the threaded set-screw configuration permits a rapid and easy recalibration of the gauge by permitting the selective repositioning of the magnet with respect to the contact member.

In the preferred embodiment of the present invention, the balance arm is urged into contact with the coating to be measured by means of a protrusion provided on the balance arm and arranged to selectively protrude beyond the housing. Preferably, the protrusion is arranged on the balance arm between the probe assembly and the pivot of the balance arm with the protrusion selectively protruding in a direction generally opposite to the probe assembly. The protrusion is preferably aligned with an adjustment wheel of the gauge so that the operator can depress the protrusion and rotate the adjustment wheel with the same index finger. The thickness of the coating to be measured is preferably indicated by a scale which is selectively movable relative to the spring by the rotation of the adjustment wheel with the scale being axially mounted on the housing. The scale preferably includes a plurality of apertures arranged about an axis of the scale with a removable plug selectively enclosing the apertures. The selective movement of the scale (during calibration) relative to the spring is facilitated through said apertures.

Still further, in the preferred embodiment of the present invention the housing for the magnetic thickness gauge preferably includes a first support provided at a first end of the housing adjacent the probe assembly with a second support provided at a second end of the housing. A third support is preferably provided at a mid-section of the housing with the first, second and third supports defining a plane. In this way, the gauge is easily held securely against the coating to be measured and the measurement may be obtained by the use of only one hand.

BRIEF DESCRIPTION OF THE DRAWINGS

Preferred embodiments of the present invention are described in detail with reference to the accompanying drawings wherein like members bear like reference numbers and wherein:

FIG. 1 is a side view of the magnetic coating thickness gauge according to the present invention with a portion of the housing cut away;

FIG. 2 is a side view of a portion of the magnetic coating thickness gauge of FIG. 1 showing the balance arm in contact with the coating to be measured;

FIG. 3 is a bottom view of the portion of the magnetic coating thickness gauge shown in FIG. 2;

FIG. 4 is a rear view of the magnetic coating thickness gauge of FIG. 1;

FIG. 5 is a rear view of the magnetic coating thickness gauge of FIG. 1 with a portion of the housing removed;

FIG. 6. is a view through the line 6—6 of FIG. 5;

FIG. 7 is an end view of the magnetic coating thickness gauge of FIG. 1;

FIG. 8 is a view through the line 8—8 of FIG. 3;

FIG. 9 is a cross-sectional view of the probe assembly of the magnetic coating thickness gauge of FIG. 1; and FIG. 10 is a cross-sectional view of another preferred embodiment of the probe assembly of the magnetic coating thickness gauge of FIG. 1.

DETAILED DESCRIPTION OF THE PREFERRED EMBODIMENTS

With reference now to FIG. 1, a magnetic coating thickness gauge 20 according to the present invention includes a two-piece housing 22 provided with a wrist strap 24 secured to one end of the housing to facilitate the handling of the gauge by the operator.

The housing 22 is preferably of a high impact resistant plastic material and is generally rectangular in construction with a plurality of supports provided to engage a coating 26 to be measured. The coating 26 is preferably of a non-magnetic composition and is preferably provided on a base member 28 which is susceptible to magnetic attraction.

With reference to FIG. 4, the housing 22 is preferably provided with surfaces 112 which facilitate a secure grasp of the gauge by the operator. These surfaces 112 are provided with a generally rough surface and may be of a vinyl material which effectively conceals a plurality of screws 88 for joining the housing portions together.

The housing 22 includes a first support 30 (see also FIG. 3) provided at a first end of the magnetic coating thickness gauge. The first support 30 comprises a generally tubular member which forms a bushing for an opening in the housing 22 (see also FIG. 8) having an end surface 32 provided with a notch 34 which is generally V-shaped in cross section. In this way, the first support 30 includes first and second feet 36, 38 which are intended to rest upon the coating 26 to be measured A second support 40 for the magnetic coating thickness gauge is provided at a second end of the gauge remote from the first support. The second support comprises first and second feet or foot pads 42 (see also FIG. 5).

A third support 44 is provided for the magnetic coating thickness gauge intermediate of the first and second supports and likewise constitutes a pair of feet or foot pads 46. Immediately adjacent the feet 46 and provided between the first support 30 and the third support 44, is a V-shaped notch 48 (see also FIG. 3) provided in a lowermost surface of the housing 22. The V-shaped notch 48 cooperates with the notch 34 of the first support 30 to permit the positioning of the magnetic coating thickness gauge on a rod or cylindrical member.

The housing 22 preferably is recessed between the first and third supports and between the second and third supports so as to not interfere with the placement of the magnetic coating thickness gauge on a flat surface. The first, second and third supports generally define a planar surface with the magnetic coating thickness gauge securely resting upon the flat surface 26 in a stable configuration.

As a result of the support arrangement, the gauge is easily positioned by the operator on the coating to be measured with only one hand. Furthermore, the gauge is in a completely stable configuration, being supported at both extreme ends of the gauge and along each side of the gauge (by the pairs of feet or foot pads).

With reference again to FIG. 1, an indicator scale 50 is axially mounted on the gauge beneath a clear plastic dial cover 52 (see also FIG. 6). The scale 50 is recessed in the vicinity of the axis of the gauge and is secured to the gauge by means of a screw 54. The dial cover 52 includes a centrally located aperture 56 which is typically closed by means of a resilient plug 58. The scale 50 includes a plurality of apertures 60 provided about the axis of the scale so as to facilitate a selective movement of the scale relative to the gauge during a calibration of the device. Upon removal of the plug 58, the plurality of apertures 60 are readily accessible to the operator and may be utilized to rotate the scale 50 about the axis of the scale. The screw 54 securely positions the scale 50 on the gauge while permitting the selective movement or rotation of the scale relative to the gauge when desired.

With reference to FIG. 5, a balance arm 62 is pivotably received by the housing 22 with the balance arm extending on either side of a pivot 64. The balance arm includes a first portion 66 which is provided with a ring portion 68 at an extreme forward portion of the balance arm. The ring portion 68 is adapted to securely receive a probe assembly 70. The forward portion 66 of the balance arm also includes a protrusion 72 which extends generally in a direction opposite to the probe assembly 70. The protrusion 72 is arranged so as to selectively protrude beyond the housing 22 when the contact assembly is not in contact with the surface to be measured. The protrusion also permits the user to easily urge the probe assembly of the balance arm into contact with the coating to be measured. The housing 22 is provided with an aperture 74 with the protrusion 72 arranged so as to freely pass through the aperture 74.

The balance arm also includes a rearward portion 76 including a fixed counterweight 78 and a movable counterweight 80. A central portion of the balance arm 82 is typically provided with first and second apertures 84, 86 with the remainder of the central portion 82 comprising a rigid connection between the front and rear portions 66, 76 of the balance arm. The adjustable counterweight 80 and the central portion 82 of the balance arm permits the balance arm to be dynamically balanced about the pivot 64.

With reference now to FIG. 4, the housing is preferably of two piece construction with a cover plate 86 removably secured to the housing by means of a plurality of screws 88. The screws 88 are received in reinforced bores 90 (see FIG. 5). The cover plate 86, with reference to FIG. 6, includes a bushing 88 which receives one end of an axle 90 carrying the balance arm 62. The other end of the axle 90 is received in a bushing 92 provided adjacent the screw 54.

The bushing 92 and the screw 54 are received in a knurled adjustment wheel 94, which is rotatably mounted in the housing 22. The adjustment wheel 94 is preferably biased away from the housing 22 by a resilient spring 96 so as to facilitate a free rotation of the adjustment wheel 94 without binding on the housing 22. The screw 54 securely connects the scale 50 to the adjustment wheel 94 while still permitting relative movement of the scale 50 with respect to the adjustment wheel 94 as desired.

To prevent the spring from being wound or unwound excessively, a pair of stops are provided on the wheel (only one of which is visible in FIG. 6 at 93). The stops selectively abut the housing to limit the extent of possible rotation of the wheel when the gauge is assembled.

Mounted on the axle 90 between the bushings 88 and 92 is the balance arm 62. A coil spring 98 is connected at one end to the balance arm 62 and is connected at the other end to the adjustment wheel 94. In this way, rotation of the adjustment wheel 94 either winds or unwinds the coil spring 98 to vary the torque provided by the spring on the balance arm 62.

With reference now to FIG. 9, the probe assembly 70 includes a casing 100 having a flange 102 provided about an upper end of the casing. The casing 100 is preferably provided of a relatively non-magnetizable material such as brass with the casing being threaded on an internal surface thereof. A magnet 104 of generally cylindrical configuration and of a size which can be readily received by the tubular casing 100, is suspended from a set-screw 106 which is threadably received by the casing 100. The set-screw 106 is preferably of ferrous material such as steel or a steel alloy so as to be releasably attached to the magnet 104 by magnetic attraction.

Preferably, the magnet 104 is of a suitable conventional magnetic material such as either the known cobalt rare earth magnets or Alnico and constitutes a relatively stable source of magnetic attraction. The use of a ferrous set-screw (as opposed to for example plastic) is believed to assist in the optimum operation of the gauge by aligning the magnetic field of the magnet 104.

The casing 100 securely holds a contact member 108 at a lowermost end thereof. The contact member is preferably a sphere of a cemented carbide, preferably tungsten carbide, containing from about 5 to 30 weight percent cobalt (or equivalent metal) binder or a sphere of a particular alloy of aluminum, iron and silicon commercially known as Alfesil (Low Wear Material). Alfesil is available from Vacuum Specialties, Inc. of Lake Geneva, Wis. in ingot form and consists of an alloy containing 5.4% aluminum, 85% iron and 9.6% silicon.

It is important in the manufacture of Alfesil that the following impurity levels are not exceeded: Carbon 0.020%; Phosphorus 0.010%; Manganese 0.006%; Sulfur 0.005% and Calcium 0.005%. It is unknown whether the above-mentioned impurity levels are significant in the use of Alfesil as the contact member material. The density of Alfesil is 6.9 grams per cubic centimeter and the electrical resistivity is 140 micro-ohm-cm. The Curie point of Alfesil is 450° and the hardness on the Rockwell scale is C 50. The ingots may be ground into spheres by any conventional suitable grinding process.

The contact member is preferably spherical primarily for economical reasons. By providing the contact member as a sphere, a desired spherical contact surface is provided (so as to permit a point contact for the probe assembly) without requiring a costly and complex machining of the contact member.

The contact member 108, 108' is preferably of a wear resistant material such as the above-mentioned tungsten carbide or the particular Alfesil alloy so as to resist a rapid erosion of the contact member. If, for example, the contact member should erode as little as perhaps 5 mils, the accuracy of the gauge (especially when measuring coatings of less than 20 mils thickness) is significantly affected Still further, the spherical contact member may be readily secured in the casing 100 either directly by way of a press fit (see FIG. 9) or through the use of a bushing (see FIG. 10). For example, if the contact member 108' is of a smaller diameter than the diameter of the bore of the casing 100, a sleeve or bushing 110 may be provided within the casing 100 so as to securely receive the contact member 108'.

Preferably, the casing 100 has a length sufficient to permit the magnet 104 to be spaced away from the contact member 108, 108' by as much as about 3/16ths of an inch. Furthermore, the threads of the casing 100 preferably permit the magnet to be selectively positioned either closer or further away from the contact member 108 without coming into physical contact with the contact member 108 other than through the casing 100. If desired, a commercially available substance such as Loctite can be applied to the threads to prevent an inadvertent repositioning of the set-screw.

With reference now to FIG. 7, an access passageway 114 is preferably provided in an uppermost surface of the housing 22 to permit access to the magnetic contact assembly 70. By removing the covering 112, the access passageway 114 becomes accessible permitting the user to adjust the position of the magnet 104 inside the contact assembly 70 through the use of a suitable tool such as an Allen wrench. Preferably, the Allen wrench is of a non-ferrous (non-magnetizable) material such as plastic so as not to interfere with the calibration of the device.

To calibrate the magnetic coating thickness gauge according to the present invention, the balance arm is first dynamically balanced about the pivot. The balance arm is mounted in the gauge housing (attached to one end of the spring) and the spring is rotated until the balance arm floats. The adjustment wheel is positioned with a stop abutting the housing so that further rotation of the spring is possible only in the direction which tensions the spring to urge the probe assembly away from the coating to be measured. The other end of the spring is then attached to the adjustment wheel and the indicator scale is rotated relative to the adjustment wheel to indicate the high end of the scale. The adjustment wheel is then rotated to position the indicator scale with the zero mark aligned beneath the indicator. The contact member is positioned in engagement with a calibration surface having a coating of either a known thickness or of no coating at all. Preferably, the calibration surface does not have a coating so that the gauge should correctly indicate a coating of zero thickness. The magnet is then moved away from the contact member 108 by rotation of the set-screw 106 (with the non-magnetic Allen wrench) until the biasing force provided by the coil spring just balances the magnetic attraction force provided by the magnet 104.

The gauge is then further calibrated in a manner readily apparent to those skilled in the art through the use of various calibration plates having thicknesses of various different known coatings. For example, calibration surfaces having coatings of 5 mils, 10 mils, 20 mils and 40 mils may be utilized with the adjustment wheel rotated until the probe assembly just separates from the calibration surface during the calibration procedure. The scale is marked during calibration so that the pointer indicates the calibrated coating surface thickness of, for example, 5 mils. In this way, the entire useful range of the gauge for a particular magnet and contact member and coil spring can be ascertained.

Typically, a magnetic coating thickness gauge according to the present invention having a contact member of Alfesil is effective over a range corresponding to zero to 8 mils. Similarly, a magnetic coating thickness gauge having a contact member of tungsten carbide is typically effective over a range of zero to 80 mils. The calibration scale obtained in this manner is generally logarithmic (and not linear) with a typical calibration scale for a tungsten carbide contact member having a value of 0 to 5 mils corresponding generally to about 0° to 90°, 5 to 20 mils corresponding generally to about 90° to 180°, and 20 to 80 mils corresponding generally to about 180° to 270°.

During normal operation, the magnetic coating thickness gauge of the present invention is positioned on the surface or coating to be measured. The operator urges the contact assembly into contact with the surface to be measured by depressing the protrusion 72. Because of the support arrangement, the operator can operate the gauge with one hand and is encouraged to move the protrusion with the index finger rather than the thumb. Likewise, because the protrusion and adjustment wheel are adjacent one another and aligned with one another, the operator is encouraged to operate the adjustment wheel with the same index finger. Preferably, the adjustment wheel is positioned so that the scale indicates a thickness significantly above the expected thickness of the coating with the adjustment knob then rotated so as to increase the torque provided by the coil spring on the balance arm. In this way, when the increased torque provided by the coil spring just balances the magnetic attraction of the probe assembly with the material beneath the coating to be measured, the probe assembly and balance arm will move out of contact with the surface to be measured. The protrusion (carried by the balance arm) will indicate the separation of the probe and coating. At that instant, the further rotation of the adjustment wheel should be ceased and the pointer will indicate the thickness of the coating to be measured.

In the event that the gauge according to the present invention should require recalibration, the access aperture 114 can be exposed by removing the covering 112 and the gauge then recalibrated in the device as described above. In summary, the set-screw can be rotated through the use of a non-magnetic Allen wrench to reposition the magnet toward or away from the contact member with the result that the magnetic attractive force provided by the magnet 104 can be readjusted easily so as to correspond to the torque provided by the coil spring 84.

The principles, preferred embodiments and modes of operation of the present invention have been described in the foregoing specification. The invention which is intended to be protected herein should not be construed as limited to the particular forms disclosed, since these are to be regarded as illustrative rather than restrictive. Variations and changes may be made by those skilled in the art without departing from the spirit of the present invention.

What is claimed is:

1. In a gauge for magnetically measuring the thickness of a coating including a housing, a balance arm rotatably mounted to the housing, a probe assembly at a location along said balance arm for providing a magnetically attracting force to urge said balance arm toward said coating to be measured, and a spring for biasing the probe assembly away from the coating to be measured, said probe assembly being adjacent a first end of said housing and including a magnet, the improvement comprising first, second and third supports provided on said housing, said supports mutually arranged to support said housing simultaneously, said first support being provided at said first end, the second support being provided at a second end of the housing opposite of said first end and said third support being provided at a midsection of the housing intermediate of said first and second ends, whereby stability of said gauge during use may be enhanced.

2. A gauge for magnetically measuring the thickness of a coating, comprising:
   a housing;
   a balance arm mounted to said housing about a pivot;
   means for selectively moving one end of said balance arm toward said coating to be measured;
   resilient means for providing a biasing force to urge said balance arm away from said coating to be measured;
   probe means for providing a magnetically attracting force urging said one end of said balance arm toward said coating to be measured, said probe means being provided on said balance arm;
   means for selectively varying the force provided by said resilient means; and
   means for indicating the thickness of said coating to be measured;
   said housing including a first support provided at a first end of said housing adjacent said probe means, a second support provided at a second end of said housing opposite of said first end and a third support provided at a mid-section of said housing intermediate of said first and second ends, said first, second and third supports mutually arranged for supporting said housing simultaneously, whereby stability of said gauge during use may be enhanced.

3. The gauge of claim 2 wherein said housing includes a first raised portion extending between said first and third supports and a second raised portion between said second and third supports.

4. The gauge of claim 3, wherein said means for selectively moving one end of the balance arm is manually operable from an upper portion of said housing, said means for providing a biasing force including a spring connected to said balance arm, said means for selectively varying the force including a wheel connected to said spring and mounted to said housing about said pivot, said wheel being operable from an upper portion of said housing.

5. The gauge of claim 4 wherein said means for indicating thickness includes a scale.

6. The gauge of claim 5 wherein said scale is selectively movable relative to said resilient means whereby said gauge may be calibrated.

7. The gauge of claim 6 wherein said scale is mounted on said housing so as to be rotatble about an axis of said pivot, said scale including a plurality of apertures arranged about said axis of said pivot with a removable member covering said apertures, said apertures facilitating said selective movement of said scale relative to said resilient means.

8. The gauge of claim 2 wherein said selectively urging means comprises a protrusion provided on said balance arm at a location between said probe means and said pivot, said protrusion arranged to protrude beyond an upper portion of said housing when said one end of the balance arm is at a raised position remote from the coating to be measured.

9. The gauge of claim 8 wherein said means for selectively varying the force includes a wheel mounted to said housing adjacent said pivot, said wheel being operable from an upper portion of said housing at a location adjacent said balance arm protrusion.

* * * * *